April 2, 1929. J. FRASER 1,707,353
VALVE HANDLE CONNECTION
Filed June 25, 1927
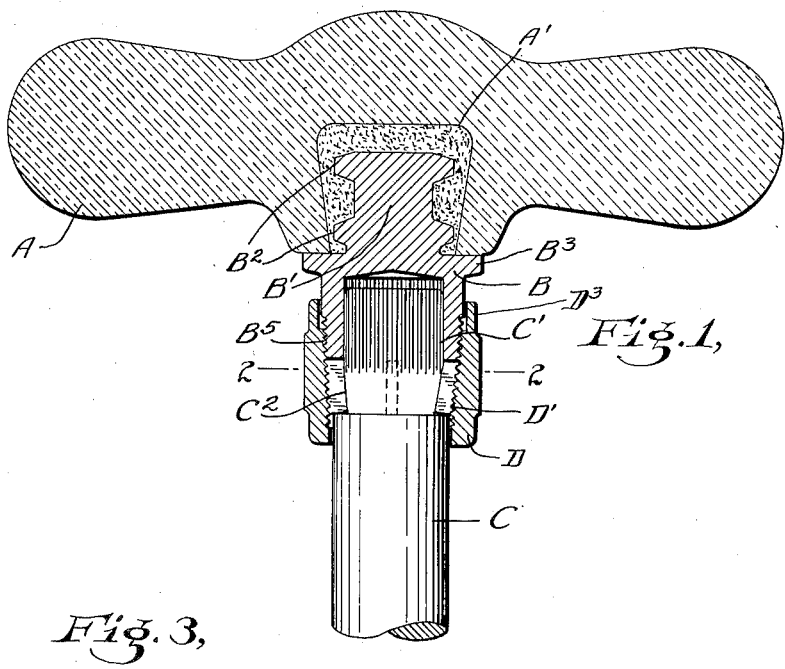
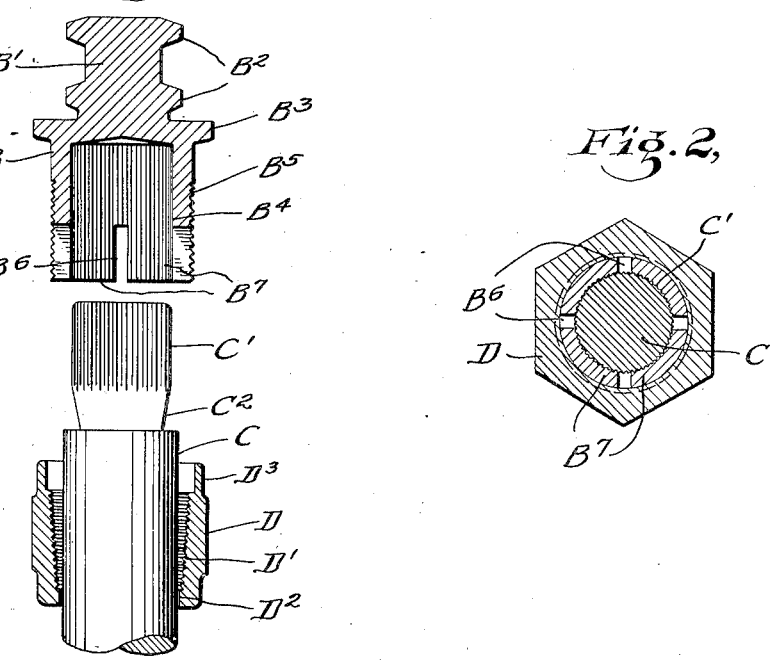
INVENTOR
JAMES FRASER
BY
John E. Hubbell
ATTORNEY Patented Apr. 2, 1929.

1,707,353

UNITED STATES PATENT OFFICE.

JAMES FRASER, OF EDGEMOOR, DELAWARE, ASSIGNOR TO SPEAKMAN COMPANY, OF WILMINGTON, DELAWARE, A CORPORATION OF DELAWARE.

VALVE-HANDLE CONNECTION.

Application filed June 25, 1927. Serial No. 201,305.

The general object of my present invention is to provide improved means for detachably connecting a knob or handle to the end of a valve stem of a valve such as an ordinary cock or faucet.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is an elevation partly in section of a valve stem and handle embodying my invention;

Fig. 2 is a section on the line 2—2 of Fig. 1; and

Fig. 3 is a view showing the parts of Fig. 1 disconnected.

In the drawings I have illustrated a preferred form of my invention shown as constituting the connecting means between the projecting end of a knob or handle A and the adjacent end of a valve stem C of a cock or faucet structure. In the construction shown, the knob or handle A comprises a body portion of a suitable material such as china or porcelain, and a metallic shank member B having one end B' anchored in a central recess A' in the body portion. The shank B is formed with flanges B² and B³ which in connection with suitable cement or the like secure the shank in its proper position in the recess A'. An axial socket formed in the outer end of the member B has its inner wall fluted or provided with longitudinal ribs B⁴ and receives the fluted upper end C' of the valve stem C, the ribs B⁴ entering the grooves in the outer wall of the part C' and thus prevents rotation of the handle relative to the valve stem. The cylindrical outer portion of the shank member B is provided with an external threaded section B⁵, and longitudinal kerfs or slots B⁶ spaced about the circumference of the member B and divide the outer end portion of that member into four sections or fingers B⁷ as shown in Figs. 2 and 3. In the assembled structure the fingers B⁷ overlap a tapered neck portion C² connecting the fluted end portion C' to the body of the valve stem. The small diameter end of the neck portion is adjacent the body of the stem and in the assembled connection the fingers B⁷ are compressed inwardly against the neck portion C² by a clamping nut D.

The nut D has its internal surface D' threaded and tapered in general conformity with the taper of the neck C² between enlarged end or cylindrical flange portions D² and D³. The end flange portion D² is slidable on the body of the valve stem C and the portion D³ fits loosely over the unthreaded portion of the shank B adjacent the collar B³.

In practice the fingers B⁷ are sufficiently resilient to be readily compressed on the tapered neck C² and to expand when the nut D is unscrewed so that the handle may then be readily removed. In the assembled structure, the clamping of the resilient sections B⁷ on the neck C² prevents relative axial movement of the handle and valve stem and relative rotation is prevented by their coacting fluted portions.

My invention is characterized by its simplicity of construction and effectiveness in use. The flange end portions D² and D³ of the nut D facilitates assemblage and avoids exposure of any threaded portion of the shank B.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. The combination with a valve stem having a longitudinal ribbed or fluted end portion and an adjacent tapered portion, the large diameter end of which is adjacent said fluted portion, of a handle comprising a tubular portion internally fluted to form a socket receiving said fluted stem portion and holding the latter against rotation therein, and externally threaded and formed with longitudinal kerfs dividing the end of said tubular portion into fingers and a clamping nut having a tapered threaded portion screwed onto said external threaded tubular portion and forcing said fingers against said tapered stem portion.

2. The combination with a valve stem having a longitudinal ribbed or fluted end portion and an adjacent tapered portion, the large diameter end of which is adjacent said fluted portion, and the small diameter of which is adjacent the main portion of said valve stem, of a handle comprising a tubular portion internally fluted to form a socket receiving said fluted stem portion and holding the latter against rotation therein, and externally threaded and formed with diametrically opposite longitudinal kerfs dividing the end of said tubular portion into fingers and a clamping nut on the valve stem having a tapered threaded portion screwed onto said external threaded tubular portion and forcing said fingers into contact with said tapered stem portion to hold said handle and valve stem against relative axial movement.

JAMES FRASER.